Feb. 5, 1957 G. D. STOUGH 2,780,371
LIFT MECHANISM FOR SWINGING RAMP OF CARRY-CAR TRAILER
Filed Oct. 24, 1955 5 Sheets-Sheet 1

INVENTOR.
GERALD D. STOUGH
BY
Whittemore, Hulbert &
Belknap
ATTORNEYS

2,780,371

LIFT MECHANISM FOR SWINGING RAMP OF CARRY-CAR TRAILER

Gerald D. Stough, Detroit, Mich., assignor to Whitehead & Kales Company, River Rouge, Mich., a corporation of Michigan Application October 24, 1955, Serial No. 542,231

14 Claims. (Cl. 214—85)

The present invention relates to improvements in the vertically movable ramp structure of a car-carrying transport or trailer, on which structure vehicles are supported in shipment by highway. The invention deals particularly with an improved and simplified power-operated mechanism for controlling the vertical movements of such a ramp structure. Although especially well suited for a trailer installation as described, it will be evident as the description proceeds that the power operating mechanism also has application in other environments requiring a reversely movable load support to receive, sustain and discharge objects of considerable weight.

Present day car loading trailers employed in the distance hauling of automotive vehicles are commonly characterized by forward and rear ramp structures mounted for vertical movement, for example by swinging about pivots of the respective ramps on the trailer frame, to permit expeditious loading and unloading of vehicles transported on the ramps at points of origin and destination. Provisions to raise and lower these ramps have in the past taken the form of hydraulic ram type hoists or power driven screw or jack arrangements of one sort or another.

Either of these types of hoist or lift are complicated and expensive as to their parts, and in regard to the necessary provisions to connect same to the ramp structure and trailer frame. They occupy a considerable amount of space within the side frames of the trailer, whose maximum overall width is regulated by law. They are, moreover, slow in action. For example, the operating stroke of a hydraulic lift or hoist may be from 30" to 46" in height, and the speed limitations of the hydraulic unit result in an inordinate lapse of time in the travel of the ramp between top and bottom positions spaced in such a limited range. Moreover, the travel is jerky, the ramp "jockeying" up and down by jumps, and each installation requires its own particular size of cylinder and piston unit, depending on the desired length of stroke.

It is, therefore, a general object of the invention to provide an improved trailer ramp structure and operating or hoist mechanism therefor, which is controlled in its vertical movements by a novel and extremely simple sprocket and chain assembly. A mechanism of this sort has substantial structural and operational advantages, as compared with known arrangements for the purpose. Thus, in addition to its improved smoothness of operation, simplicity and consequent lessened cost of production and assembly, it is only necessary, in order to apply the subject mechanism to ramp installations of different vertical travel or throw, to employ chain components of different lengths.

More specifically the invention has an object to provide a ramp hoist structure employing a rotatable sprocket or equivalent driver or drivers carried by the ramp proper and preferably powered by a motor or like operator, also mounted on the ramp structure, which rotatable drive means has continuous driving engagement with an elongated chain anchored at the opposite ends thereof by supports on the frame of the trailer. Upon rotation of the sprocket in one direction or the other the same is caused to ride along and raise or lower itself in the direction of the length of the chain, correspondingly raising or lowering the ramp by which the sprocket is borne.

Another specific object is to provide a ramp structure in accordance with the adaptation chosen for illustration, in which a car supporting ramp is pivotally mounted, preferably adjacent but inwardly of one end thereof, on a transport or trailer frame, the hoist mechanism as described in the preceding paragraphs having its driver or sprocket carried by the ramp adjacent the opposite end of the latter. In such an installation the flexible chain is anchored resiliently at its lower end to a lower support on the trailer frame and is swivelled at its top to the frame. The flexibility of the chain, as drivingly engaged by the driver sprocket, accommodates the lateral, horizontal increment of the arcuate travel of the ramp end, as does the resilient mounting of the chain. The resilient mount also maintains tension on the chain to keep it taut.

Another specific aspect of the invention resides in the provision of power driven operating means for the drivers of the mechanism, which is capable of being produced as a unitary sub-assembly including a ramp cross bar mounting a prime mover and its power transmission and speed reduction connections to the sprockets or drivers. A sub-assembly of this character is readily applied to different types of ramp structure or equivalent device to be controlled by the hoist mechanism.

In alternative embodiments of the invention, objects are to provide, as in one case, for a self-locking transmission of power from a prime mover, such as an electric motor mounted on the ramp, to transverse, sprocket actuating shaft means journaled on the ramp through the agency of an irreversible and speed reducing driving unit, the shaft means in turn transmitting power through further reduction gearing to the hoist sprockets; in another form separate prime mover units are applied to opposite sides of the ramp structure, these units acting through reduction gearing to rotate associated driver sprockets; in still another embodiment it is contemplated to employ individual motors, as just referred to, which are coordinated or synchronized as to their driving action on the sprockets by means such as a flexible cable interconnecting their output shafts; while in yet another proposed modification a center mounted motor direct drives flexible shafting which is connected to the side sprockets through gear reduction units.

In any of the proposed embodiments of the invention, it is an object to provide an arrangement in which a rotative sprocket carried by the structure to be controlled is maintained at all times in positive driving engagement with an elongated chain, with an adequate wrap of the latter on the sprocket, by means of an idler mounted on the ramp with its axis in offset relation to the axis of the sprocket, and in such relation to the anchors of the chain as to cause the latter to maintain the desired wrap and positive driving relation to the sprocket.

Generally, it is the object of the invention to provide a ramp structure and operating mechanism therefor as described in the preceding paragraphs which is of maximum simplicity and ruggedness in the character and relationship of its parts, thus affording great structural and operational advantages as compared with previously available mechanisms for a comparable purpose. Further, the invention provides structure of this character which does not in any degree diminish the width available between the trailer frames to receive vehicles.

Other objects and features of the invention will become apparent as the description proceeds, especially when taken in conjunction with the accompanying drawings, wherein.

Figure 1:
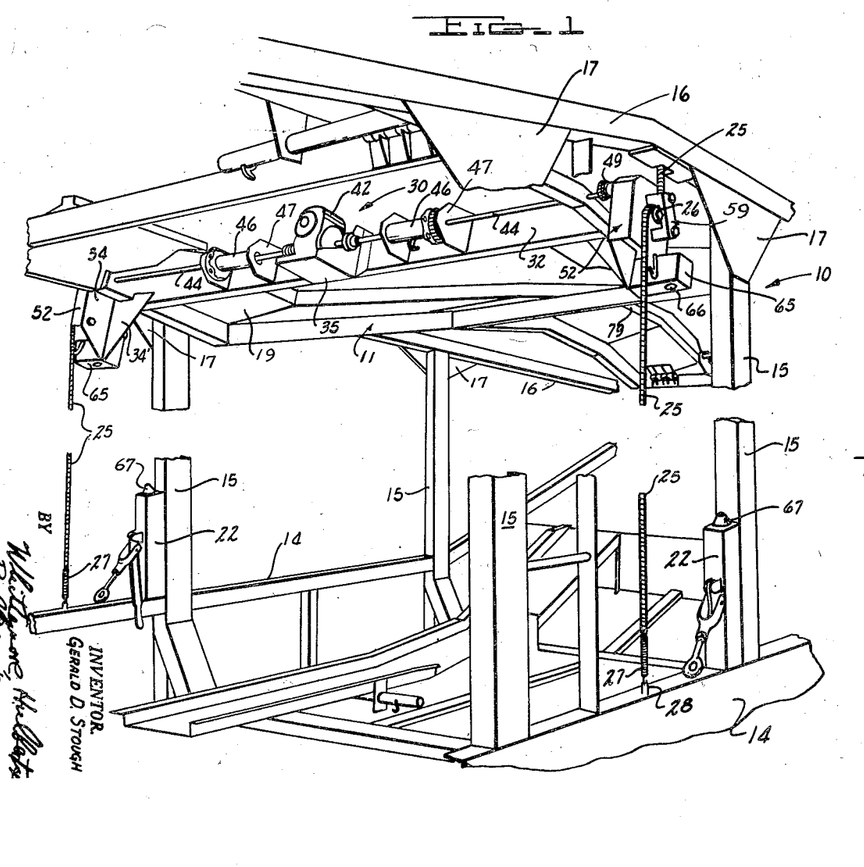
Fig. 1 is a fragmentary perspective view, partially broken away, of a trailer ramp and hoist structure according to the invention, representing the forward ramp unit as viewed from a point to its rear.
Figure 5:
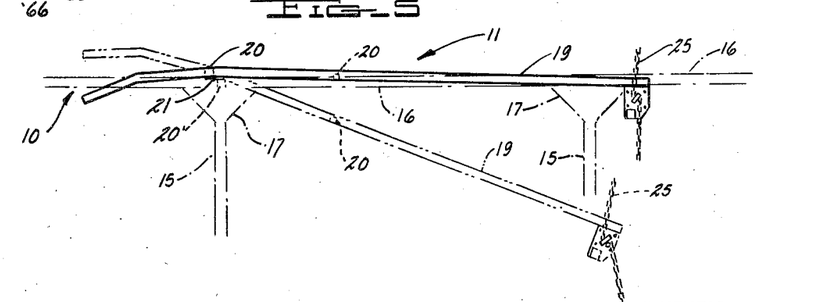
Fig. 5 is a fragmentary view in side elevation showing the raised and lowered positions of the ramp-hoist structure in relation to the trailer frame, these positions being in solid and dot-dash lines, respectively.
Figures 6, 7, 8, 9, 12, 13, 14, 15:
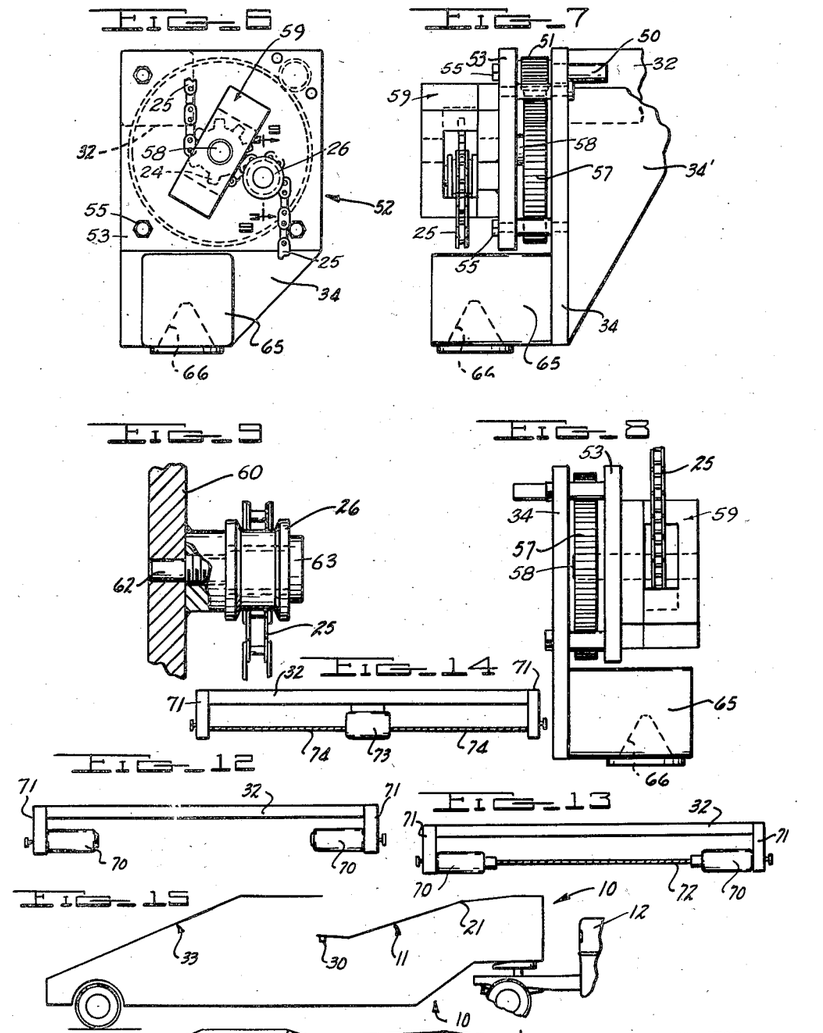
Fig. 6 is a view in side elevation of a sprocket and gear reduction unit such as is applied to each side of the ramp structure, in the position generally indicated in Fig. 5.
Fig. 7 is an elevational view of the structure of Fig. 6, as from the righthand thereof.
Fig. 8 is an elevation of the structure of Fig. 6 but from the lefthand side thereof.
Fig. 9 is an enlarged fragmentary view of the idler mount of this structure, being partially broken away and in section along line 9—9 of Fig. 6.
Figs. 12, 13 and 14 are schematic views of alternative driving or operating arrangements in accordance with three further modifications thereof.
Figs. 15 and 16 are diagrammatic views illustrating the manner of manipulating the improved ramp structure in the loading and unloading of vehicles on the trailer.
Figure 16:
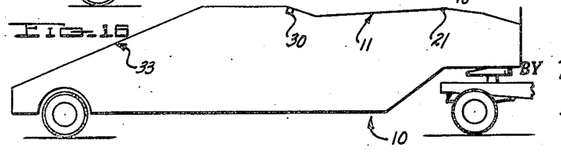

The general arrangement of the ramp structure and hoist mechanism of the invention in relation to a conventional type of car transport or trailer 10 is shown in Fig. 1 of the drawings, and also in a schematic way in Figs. 15 and 16. Reference may also be made to Fig. 5 for a showing of the front ramp structure 11, i. e. immediately to the rear of the operator's cab 12, with which the invention deals in particular. As depicted in these views, the ramp structure is one which is pivotally mounted upon the frame of the trailer 10, preferably intermediate its forward and rear ends; however, it is to be clearly understood that the improved ramp operating mechanism of the invention is equally adapted for application to other types of ramp or equivalent structures, not necessarily pivotally mounted or movably mounted at any particular point. Thus it is contemplated that the principles of the invention may be employed in connection with a ramp of the general character referred to which is pivoted at an end thereof, or has provision to mount the same for a swinging movement accompanied by some bodily translation, and the like. The improved hoist or operating mechanism has perhaps its best application to a carry-car trailer or transport 10 of the illustrated sort, although other uses will doubtless suggest themselves to those skilled in the art.

The trailer 10, as shown in Fig. 1, comprises a strong and rigidly braced metal framework including laterally spaced lower side members or beams 14 connected by upright side posts 15 with an upper frame structure including laterally spaced side chords 16 of appropriate rigid type, rigidly braced to the uprights 15 by side plates 17.

The ramp structure 11 essentially comprises a pair of parallel flanged tracks 19 rigidly braced by transverse cross members 20 of box-like section to constitute the ramp structure 11. This structure is, in the illustrated embodiment, pivotally mounted to the spaced upper frame chords 16 by means of hinges 21 having one leaf thereof secured on a cross member 20 located inwardly of the forward end of the respective ramp tracks 19 and the other leaf appropriately secured to the upper frame, as to a cross member 20' extending between and bracing the frame side chords 16. A mount of this character, i. e. by fulcruming the structure 11 intermediate its ends affords a "teeter-totter" action to counterbalance the ramp to some extent and thus diminish the load to be borne by the hoist mechanism of the invention, which is generally designated 23. However, as pointed out above, the specific nature of the arrangement mounting the ramp structure for its desired movement is not controlling in the present invention.

Figure 2:
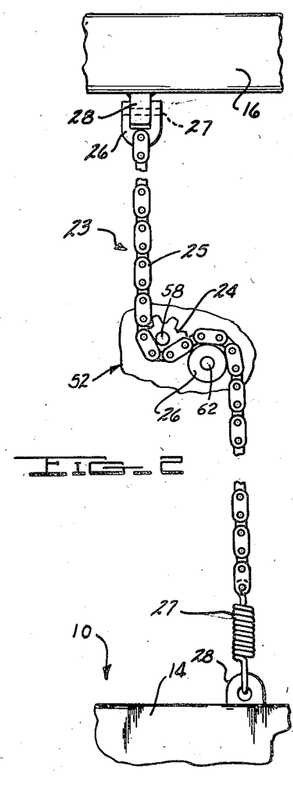
Fig. 2 is a fragmentary, somewhat schematic view in side elevation of the essential operating components of the improved hoist mechanism, as operatively mounted on the ramp and trailer frame.
Figure 3:
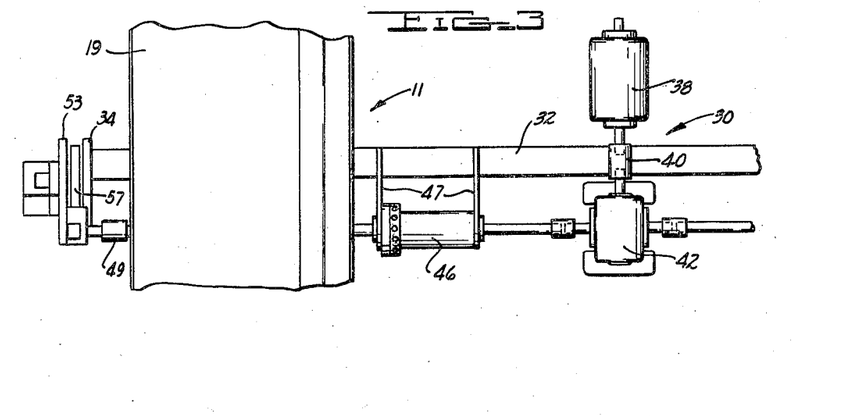
Figs. 3 and 4 are fragmentary and somewhat schematic, top plan and face views of one-half of the operating mechanism for the hoist parts of Fig. 2, the remainder of the operating mechanism being a duplication of the parts shown, and a portion of a ramp track appearing in each view.
Figure 4:
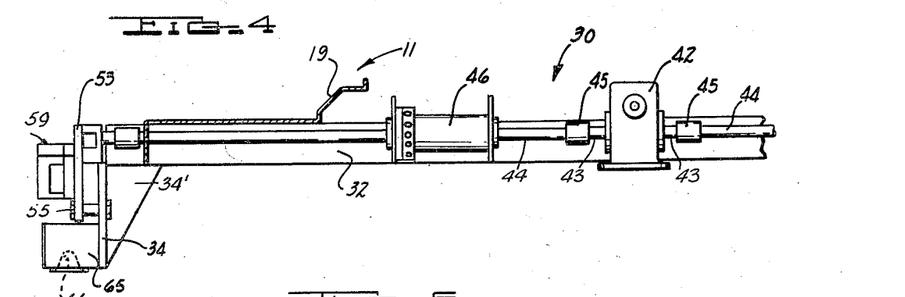

By reference to Fig. 1 of the drawings it will be noted that a stop abutment 22 is fixedly associated adjacent each of a pair of the frame uprights 15 on opposite sides of the trailer frame, whereby these abutments can sustain the weight of the ramp structure 11 at its outer or rear extremity when the ramp is in its lowered position. The weight of the structure 11, and an object thereon, may be sustained by the hoist mechanism 23 when the ramp is in its elevated position. The elevated and lowered positions of the ramp structure 11 are respectively illustrated in solid and dotted lines in Fig. 5 of the drawings. Reference may be made to Fig. 2 of the drawings, in conjunction with Fig. 1, for an understanding of the general nature and composition of the operating or hoist mechanism 23. It comprises a rotative driver in the form of a sprocket 24 journaled on the ramp structure 11 in a manner hereinafter explained in detail. In the embodiment of the invention herein illustrated, the mounting of sprocket 24 is at the rear, free-swinging end of the structure 11; however, the position of the driver sprocket 24 will be determined by the nature of the mount for the movable ramp structure 11. The second component of the mechanism 23 is an elongated flexible link type power transmission chain 25 of adequate strength to sustain the load it is called on to bear. It is to be understood that there are two such chains 25 and sprockets 24 of a hoist mechanism 23 on each of the opposite sides of the trailer frame. The chains 25 are pivotally connected to the respective upper frame chords 16, as by means of a swivel yoke 26 and pin 27 pivoting the same to a depending apertured lug 28 fixed on each of the upper chords 16.

The chains 25 extend downwardly and are trained about the respective sprockets 24 in positive driving engagement with the sprocket teeth, and are then brought about flanged idler rollers 26 to insure a substantial wrap of the chain about the sprocket. The idlers 26 are rotatively mounted on the ramp structure 11 adjacent the sprockets 24 in a fashion to be described. After passing over the idlers 26, the chains 25 extend downwardly to the lower side frame members 14, to which they are anchored by coil tension springs 27 interposed between their lower extremities and anchoring lugs 28 fixed on the respective frame members 14. It is therefore evident that, as the sprockets 24 are rotatively driven in synchronism by any appropriate means, several embodiments of which will be hereinafter described, the sprockets 24 are caused to ride up and down the respective chains 25 in accordance with the direction of their rotation, the chains serving as flexible reaction members in this action. The portion of the ramp structure 11 on which the sprockets 24 are mounted is correspondingly elevated and lowered between the positions illustrated in solid and dotted lines in Figs. 5, 15 and 16. The ramp structure is shown in Fig. 1 in its elevated position.

Reference should be made to Figs. 6 through 11, in conjunction with Fig. 1, for specific details of the operating unit by which the sprockets 24 of the hoist mechanism 23 are driven. The operating structure or mechanism referred to is generally designated by the reference numeral 30, and it is to be noted, as the description proceeds, that the invention affords such a structure 30 which may be produced as a unitary sub-assembly of power prime mover, power transmission provisions including appropriate reduction gearing, and the like. A pre-assembled unit of this character may be readily applied as desired to any particular type of ramp structure 11, or its equivalent, in accordance with the particular requirements imposed by the manner of mounting or arranging the structure in question. The operating structure 30 of the hoist 23 comprises a strong rigid cross bar 32, preferably of box section, to which the tracks 19 are secured as by welding adjacent the opposite ends of the cross bar. The bar 32 extends transversely of the ramp structure, paralleling its cross brace members 20, and is located, as shown in Fig. 5, adjacent the rear extremity of the front ramp structure 11, i. e. the structure immediately to the rear of the operator's cab 12. Parenthetically, any appropriate provisions may be employed for operating the rear ramp structure 33 of the trailer, which is illustrated only in Figs. 15 and 16. On its opposite end extremities the cross bar 32 carries vertically disposed plates 34 of the outline shown in Fig. 6, the bar being preferably welded to the plates adjacent corresponding corners thereof, and the thus constituted end construction being preferably braced by triangular bracket webs or plates 34' welded to the respective cross bar 32 and end plate 34.

Figure 11:
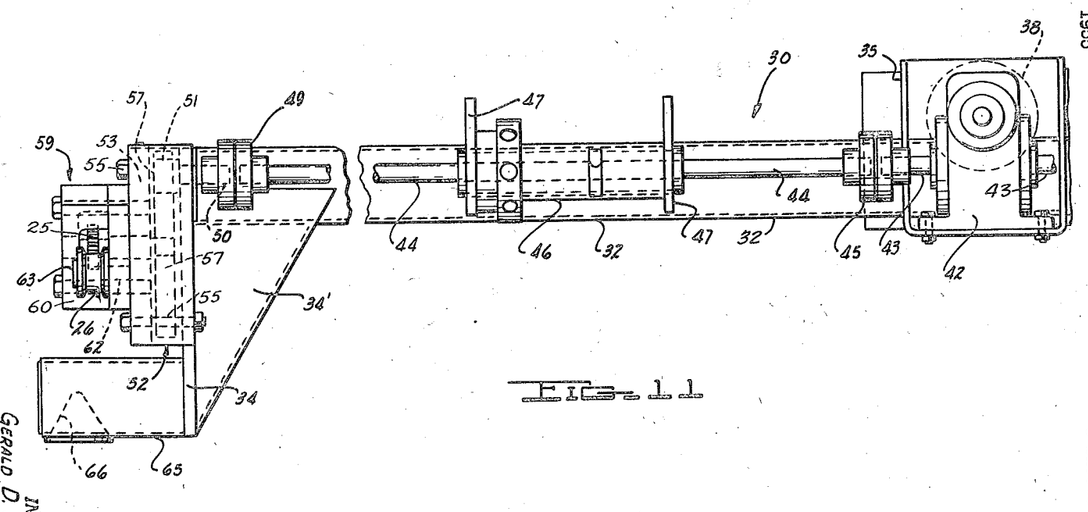

As shown in Figs. 1 and 11, a substantially U-shaped cradle 35 is rigidly secured to the cross bar 32 substantially midway its ends and projects rearwardly therefrom. Forwardly of the cross bar 32, the cradle 35 carries a fixed attaching plate or bracket 36, to which a mounting plate 37 of an electric motor 38 of appropriate rating is secured. The motor is drivingly connected by a suitable coupling 40 to the forwardly extending input shaft 41 of a speed reduction unit 42, bolted at its base to the cradle 35. Unit 42 may be any appropriate design, but preferably is a worm and worm wheel type and has output shafting 43.

The shafting 43 is drivingly connected, at opposite sides of the speed reduction unit 42, with transversely extending power shafts 44, through the agency of flexible or slip couplings 45. These shafts 44 extend through the bores of sleeve-like winches 46 mounted for rotation in brackets 47 welded to the cross bar 32. The specific relationship of the shafts 44 and winch structure is not germane to the invention. The winches 46 are employed in tying down a vehicle on the ramp 11 to stabilize it in transport, and it is simply in the interest of compactness that the shafts 44 are arranged coaxially to pass through its bore.

Adjacent its outer extremity each shaft 44 is connected to one-half of a flexible coupling 49, the other half of which has secured thereto the shaft extension 50 of a small driver pinion 51 which is mounted externally of the end plate 34 on cross bar 32.

Preferably, a gear reduction housing 52 is applied to each end plate 34, externally thereof, to receive further gearing associated with the pinion 51 as shown in Fig. 11, each housing 52 includes a rigid plate 53 arranged in laterally outwardly spaced relation to an end plate 34 and secured thereto by suitable bolts 55 and interposed spacers. Preferably the bolts are located at three corners of the plates 34, 53 other than the corner at which the pinion 51 is received therebetween and rotatively journaled thereby.

An external sheet-like cover or shell 56 is applied to the plates 34, 53 to enclose the space therebetween.

Figure 10:
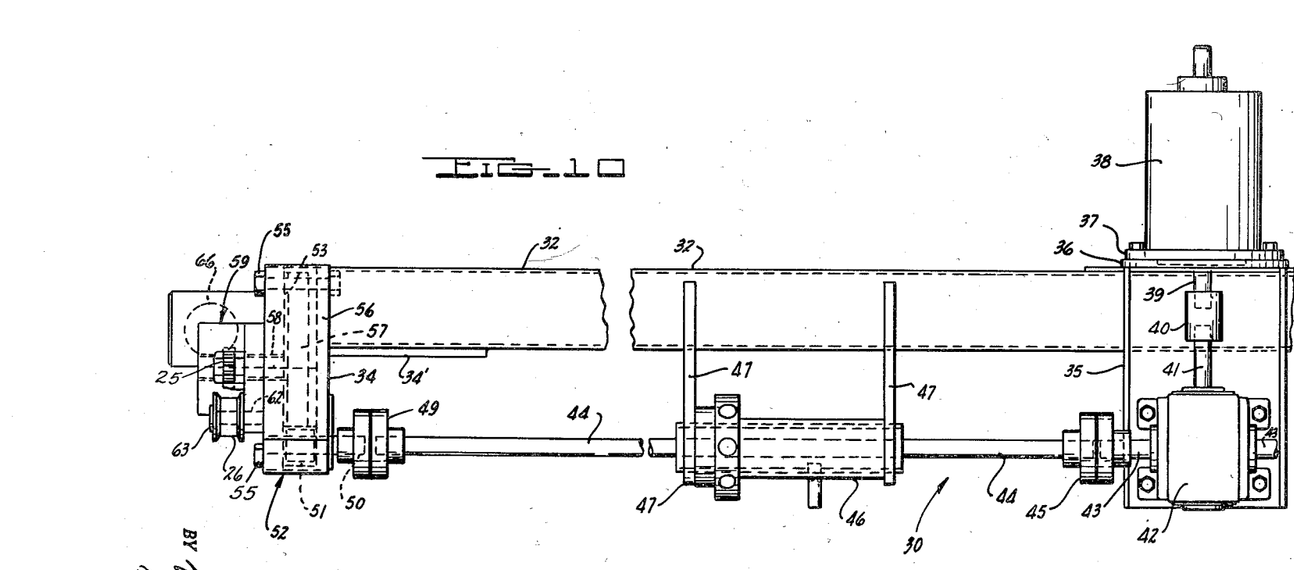
Figs. 10 and 11 are, respectively, fragmentary top plan and face views of the operating mechanism of the hoist showing structural details thereof.

A relatively large gear 57 is disposed within the housing 52 in mesh with the pinion 51, and a shaft 58 to which the gear 57 is secured is centrally journaled in the outer plate 53, as shown in Fig. 10. Externally associated with the housing plate 53 is a sprocket mount or support, generally designated 59, to which the driver sprocket 24 and idler 26 are applied. The mount 59 may take the form of an appropriate bracket 60 bolted to plate 53, and this bracket is apertured in alignment with the gear shaft 58 to rotatively receive the latter.

The sprocket 24 is secured on gear shaft 58 in fixed relation to the latter. The idler roller 26 is rotatable on a rod or stem 62 fixed to bracket 60 and extending outwardly thereof, an outer flange 63 on the stem 62 holding the idler 26 axially in place. The reaction chain 25 engages sprocket 24 and idler 26 in the manner shown in Figs. 2 and 6.

Referring to Figs. 6 and 11, the end plate 34 carried by cross bar 32 is provided with an externally projecting stop member 65, preferably in the form of a length of tubular stock of rectangular box outline, to which is secured an internal socket element 66, the socket opening downwardly. The stop 65 rests on the fixed stop abutment 22 on lower trailer frame 14 when the ramp structure 11 is in its lowered position, the socket 66 then nesting on a correspondingly shaped registering projection 67 at the top of abutment 22.

In the embodiment of the invention thus far described, power is transmitted from a prime mover motor 38 through a reduction unit 42 to the end gear reduction units, including meshing pinion 51 and gear 57, to the chain driving sprocket 24. Modifications of this particular power train are of course possible.

For example, in Fig. 12 there is schematically designated an arrangement in which individual electric motors 70 are mounted at each end of a cross bar 32, each having a driving connection to a chain and sprocket mechanism 23 through a gear reduction unit 71 mounted on the ends of the cross bar 32 in the manner described above with reference to Figs. 6 through 11. The motors 70 will be appropriately governed in their reversing operation through a suitable control arrangement (not shown) to coordinate or synchronize the same in their output to the hoist mechanism 23.

An alternative driving installation is illustrated in Fig. 13, in which individual motors 70 are similarly connected with gear reduction units 71 on the opposite ends of cross bar 32, however these motors have their shafts connected by a transversely extending flexible shaft 72 for the purpose of synchronizing the movement of the hoists 23 on opposite sides of the trailer.

A still further alternative is illustrated in Fig. 14 of the drawings. In this case, an initial gear reduction unit such as the unit 42 of the first embodiment is omitted and a single motor 73 supported at the midpoint of cross bar 32 is drivingly connected through transversely extending flexible shafts 74 with gear reduction units 71 on the opposite ends of cross bar 32.

In the operation of the ramp-hoist combination depicted in any of the above described embodiments, energization of the prime mover, or prime movers, as the case may be, transmits power through gear reduction units fixedly mounted on opposite ends of the cross bar 32, and the rotation of the sprockets 24 at reduced speed ensues. The sprockets ride up and down the flexible cable or reaction member 25 in coordinated relation, causing the ramp structure on the end of which the sprockets are mounted to rise and fall correspondingly.

Note should be taken that the coil tension springs 27, through which the lower ends of the chains 25 are anchored to lower frame member 14 maintain the chains taut and, at the same time, permit the lateral movement of the sprockets 24 and idlers 26 on the cross bar 32 which is inherent in the arc of vertical movement of the cross bar. This is of particular significance in an arrangement such as that shown, in which the ramp structure 11 is pivotally mounted on the frame adjacent one extremity thereof, the operating mechanism or structure 30 for the hoist being carried on the opposite end of the ramp. A resilient mount for the lower end of the chain 25 is desirable, however, in any installation as a means of maintaining tautness of the chain. A swivel mounting of the chain to the upper yoke 26, which is in turn swiveled to the upper frame chord 16, further contributes to a desired universality of movement of the flexible cable components.

The general scheme of employing the improvement is illustrated in Figs. 15 and 16. For example, in Fig. 15 the front and rear ramps 11, 33, respectively, are in their lowered positions to carry vehicles while the trailer is in transit. The view is entirely diagrammatic and no particular effort has been made to show the positional relationships exactly. Fig. 16 illustrates the ramp 11 in its elevated position so that a vehicle may be driven from the ground via a removable skid (not shown) onto the lowered ramp 33 and thence onto the elevated ramp 11. When such vehicle is unloaded it is driven from the elevated ramp 11 onto the lowered rear ramp 33 and thence over the skid mentioned to the ground. After a vehicle has been loaded as described onto the elevated ramp 11, an additional vehicle may be driven from the ground via the skid mentioned onto the lowered ramp 33. Then the ramp 11 may be lowered to the position in Fig. 15. However, before the ramps 11 and 33 are loaded with vehicles, both ramps 11 and 33 may be elevated to enable two additional vehicles to be driven from the ground via skids (not shown) into or from the space in the trailer beneath the ramps 11 and 33.

The improved hoist affords a means to raise and lower the ramp 11 with or without a vehicle in place for transportation. This motorized hoisting arrangement may be powered from the tractor bodily or any other suitable auxiliary power source. It is also contemplated to provide a removable crank which may be applied to the drive structure 30 in an emergency, or should the motor of the mechanism become inoperative.

The mechanism is smooth and desiredly speedy in its operation. It is extremely simple and compact, being produced and assembled to a trailer, preferably as a complete sub-assembly, as stated, in an economical and expeditious fashion. It is fully adaptable in application to trailer installations requiring ramp lifts of considerably different heights. It is only necessary to select an appropriate length of the chains 25 for any desired installation. In driving the cross bar 32 up and down at both of its ends, in a positive and coordinated way, there is no possibility of subjecting the rack structure to twisting or wracking forces of a destructive sort. The chains 25 are amply capable of sustaining the weight of the rack and its load, and this ability is furthered by the fulcruming of the structure 11 at a hinge or pivot 21, which is located inwardly of the forward end of the structure. The rack and loaded object themselves thus counterbalance in part and minimize the weight to which the chains 25 are subjected.

What I claim as my invention is:

1. An operating mechanism for a pivoted ramp of a car transport or the like having a supporting frame on which said ramp is mounted for elevating and lowering movements, said mechanism comprising a rotative sprocket mounted on said ramp, means to rotate said sprocket in opposite directions including an operator and irreversible gearing connecting said operator and sprocket, and an elongated vertically extending chain in driving engagement with said sprocket and anchored at its upper end to said frame, and a spring connecting the lower end of said chain to said frame whereby rotation of the sprocket occasions its movement lengthwise of said chain to correspondingly elevate and lower said ramp and arcuate motion of the free end of said ramp is accommodated by said spring.

2. An operating mechanism for a ramp of a car transport having a supporting frame on which said ramp is pivotally mounted at one end for elevating and lowering of its free end, said mechanism comprising a pair of rotative driver sprockets mounted on said ramp adjacent said free end, means to rotate said driver sprockets in opposite directions, a pair of elongated flexible chains in driving engagement with said driver sprockets and anchored at their opposite ends on said frame, whereby rotation of the driver sprockets occasions their movement lengthwise of said chains to elevate and lower said ramp, an operator carried by said ramp between said driver sprockets, shaft means journaled on and extending transversely across said ramp between said sides thereof, a speed reducer operatively connected between said operator and said shaft means, and a driving connection from said shaft means to said respective driver sprockets including speed change devices operatively connecting said shaft means and said respective sprockets.

3. An operating mechanism for a ramp of a car transport having a supporting frame on which said ramp is pivotally mounted at one end for elevating and lowering of its free end, said mechanism comprising a pair of rotative driver sprockets mounted on said ramp adjacent said free end, means to rotate said driver sprockets in opposite directions, a pair of elongated flexible chains in driving engagement with said driver sprockets and anchored at their opposite ends on said frame, whereby rotation of the driver sprockets occasions their movement lengthwise of said chains to elevate and lower said ramp, a pair of individually driven operators mounted on said ramp adjacent said sides thereof, and driving connections between said operators and said respective sprockets.

4. An operating mechanism for a ramp of a car transport having a supporting frame on which said ramp is pivotally mounted at one end for elevating and lowering of its free end, said mechanism comprising a pair of rotative driver sprockets mounted on said ramp adjacent said free end, means to rotate said driver sprockets in opposite directions, a pair of elongated flexible chains in driving engagement with said driver sprockets and anchored at their opposite ends on said frame, whereby rotation of the driver sprockets occasions their movement lengthwise of said chains to elevate and lower said ramp, an operator carried by said ramp between said driver sprockets, shaft means journaled on and extending transversely across said ramp between said sides thereof, said shaft means being flexible in character and being rotatively actuated directly by said operator, and a driving connection from said shaft means to said respective driver sprockets, including speed change devices operatively connecting said shaft means and respective sprockets.

5. An operative mechanism for a ramp of a car transport having a supporting frame on which said ramp is pivotally mounted at one end for elevating and lowering of its free end, said mechanism comprising a pair of rotative driver sprockets mounted on said ramp adjacent said free end, means to rotate said driver sprockets in opposite directions, a pair of elongated flexible chains in driving engagement with said driver sprockets and anchored at their opposite ends on said frame, whereby rotation of the driver sprockets occasions their movement lengthwise of said chains to elevate and lower said ramp, a pair of individual operators mounted on said ramp adjacent said sides thereof, driving connections between said operators and said respective driver sprockets, and a flexible shaft interconnecting said operators to coordinate the rotation of said respective sprockets.

6. An operating mechanism for the ramp of a car transport having a frame to which one end of the ramp is pivoted to provide for arcuate substantially vertical movement of the free end thereof, said operating mechanism comprising a pair of laterally spaced chains rigidly connected at their upper ends to said frame, resilient means connecting the lower ends of said chains to said frame, a pair of driving sprockets rotatably carried by said ramp adjacent the free end thereof and in meshed engagement with said chains, and drive means mounted on the ramp and connected to said sprockets for driving said sprockets in timed relation, said resilient means accommodating the movement of said chains occasioned by arcuate movement of the free end of said ramp.

7. The combination with support structure comprising two laterally spaced pairs of vertically spaced relatively fixed members, and a ramp located between said laterally spaced pairs and pivotally connected adjacent one end to said support structure, the other end of said ramp being adapted to be raised and lowered between said laterally spaced pairs, of means for raising and lowering the said other end of said ramp including a pair of chains located respectively at opposite sides of the said other end of said ramp and extending vertically between and terminally connected to said relatively fixed members, drive sprockets carried by said ramp adjacent opposite sides thereof and drivingly engageable with and movable lengthwise of said vertically extending chains, a motor carried by said ramp for actuating said sprockets, and means operatively connecting said motor with said sprockets, comprising shaft means rotatably mounted on and extending transversely of said ramp, means drivingly connecting said motor directly with said shaft means, and reduction means drivingly connecting opposite ends of said shaft means with said respective sprockets, whereby rotation of said sprockets causes them to travel lengthwise of said vertically extending chains.

8. The combination with a support comprising two laterally spaced pairs of vertically spaced relatively fixed members, and a ramp located between said laterally spaced pairs and pivotally connected adjacent one end to said support, the other end of said ramp being adapted to be raised and lowered between said laterally spaced pairs, of means for raising and lowering the said other end of said ramp including two chains located respectively at opposite sides of the said other end of said ramp and extending vertically between and terminally connected to said relatively fixed members, sprockets carried by said ramp adjacent opposite sides thereof and engaged with and movable lengthwise of said vertically extending chains, and means also carried by said ramp for actuating said sprockets, comprising independent motors drivingly connected to said respective sprockets, whereby rotation of said sprockets causes them to travel lengthwise of said vertically extending chains.

9. The combination with a support comprising two laterally spaced pairs of vertically spaced relatively fixed members, and a ramp located between said laterally spaced pairs and pivotally connected adjacent one end to said support, the other end of said ramp being adapted to be raised and lowered between said laterally spaced pairs of means for raising and lowering the said other end of said ramp including two chains located respectively at opposite sides of the said other end of said ramp and extending vertically between and terminally connected to said relatively fixed members, sprockets carried by said ramp adjacent opposite sides thereof and engaged with and movable lengthwise of said chains, and means also carried by said ramp for actuating said sprockets, comprising motors drivingly connected to said respective sprockets, whereby rotation of said sprockets causes them to travel lengthwise of said vertically extending chains, and flexible shafting interconnecting the shafts of said motors.

10. An operating mechanism for a ramp or like elongated member pivotally mounted adjacent one end for vertical swinging movement of its opposite end relative to vertically spaced fixed supports, said mechanism comprising a vertically extending elongated flexible chain connected at its opposite ends to said vertically spaced supports, the connection to said lower support being resiliently yieldable, a rotative sprocket carried by said ramp adjacent its last named end and engaged in driving relation with said chain between said connections, and an operator carried by said ramp and drivingly connected with said sprocket to rotate the latter and cause vertical swinging movement of said last named ramp end along a curved path between said vertically spaced supports.

11. In a car transport having support structure including two laterally spaced pairs of vertically spaced relatively fixed members, a ramp located between said laterally spaced pairs and pivoted adjacent one end thereof to said support structure, the other end of said ramp being free and movable upwardly and downwardly in an arcuate path relative to said vertically spaced members, a pair of chains located respectively at opposite sides of the free end of said ramp and extending vertically between and terminally connected to said relatively fixed members, a cross bar secured to and extending transversely of said ramp adjacent the free end thereof, and drive mechanism for effecting raising and lowering movement of the free end of said ramp comprising motor means fixedly carried by said cross bar, rotatable drive sprockets carried by the end portions of said cross bar and drivingly engaged with said chains whereby rotation of said sprockets effects raising and lowering movement of the free end of said ramp, and drive means connecting said motor means to said sprockets for effecting simultaneous rotation of said sprockets.

12. The combination with support structure comprising two laterally spaced pairs of vertically spaced relatively fixed members, and a ramp located between said laterally spaced pairs and pivotally connected adjacent one end to said support structure, the other end of said ramp being adapted to be raised and lowered between said laterally spaced pairs, of means for raising and lowering the said other end of said ramp including a pair of elongated flexible elements located respectively at opposite sides of the said other end of said ramp and extending vertically between and terminally connected to said relatively fixed members, drive elements carried by said ramp adjacent opposite sides thereof and drivingly engageable with and movable lengthwise of said vertically extending flexible elements, a motor carried by said ramp for actuating said drive elements, and means operatively connecting said motor with said drive elements, comprising shaft means rotatably mounted on and extending transversely of said ramp, means drivingly connecting said motor directly with said shaft means, and reduction means drivingly connecting opposite ends of said shaft means with said respective drive elements, whereby rotation of said drive elements causes them to travel lengthwise of said vertically extending flexible elements.

13. The combination with a support comprising two laterally spaced pairs of vertically spaced relatively fixed members, and a ramp located between said laterally spaced pairs and pivotally connected adjacent one end to said support, the other end of said ramp being adapted to be raised and lowered between said laterally spaced pairs, of means for raising and lowering the said other end of said ramp including two elongated flexible elements located respectively at opposite sides of the said other end of said ramp and extending vertically between and terminally connected to said relatively fixed members, rotatable elements carried by said ramp adjacent opposite sides thereof and engaged with and movable lengthwise of said vertically extending flexible elements, and means also carried by said ramp for actuating said rotatable elements, comprising independent motors drivingly connected to said respective rotatable elements, whereby rotation of said rotatable elements causes them to travel lengthwise of said vertically extending flexible elements.

14. In a car transport having support structure including two laterally spaced pairs of vertically spaced relatively fixed members, a ramp located between said laterally spaced pairs and pivoted adjacent one end thereof to said support structure, the other end of said ramp being free and movable upwardly and downwardly in an arcuate path relative to said vertically spaced members, a pair of elongated flexible elements located respectively at opposite sides of the free end of said ramp and extending vertically between and terminally connected to said relatively fixed members, a cross bar secured to and extending transversely of said ramp adjacent the free end thereof, and drive mechanism for effecting raising and lowering movement of the free end of said ramp comprising motor means fixedly carried by said cross bar, rotatable drive elements carried by the end portions of said cross bar and drivingly engaged with said elongated flexible elements whereby rotation of said drive elements effects raising and lowering movement of the free end of said ramp, and drive means connecting said motor means to said drive elements for effecting simultaneous rotation of said drive elements.

References Cited in the file of this patent

UNITED STATES PATENTS

| | | |
|---|---|---|
| 1,470,292 | Scheunert | Oct. 9, 1923 |
| 2,605,914 | Hala | Aug. 5, 1952 |
| 2,617,368 | McCormick | Nov. 11, 1952 |
| 2,647,010 | Huebschman | July 28, 1953 |
| 2,694,597 | Kunz | Nov. 16, 1954 |
| 2,711,262 | Bing | June 21, 1955 |